(12) United States Patent
La Russa

(10) Patent No.: US 6,476,944 B1
(45) Date of Patent: Nov. 5, 2002

(54) IMAGE-FORMING APPARATUS

(76) Inventor: Joseph A. La Russa, 97 Roosevelt Dr., Poughquag, NY (US) 12570

( * ) Notice: Subject to any disclaimer, the term of this patent is extended or adjusted under 35 U.S.C. 154(b) by 0 days.

(21) Appl. No.: 09/691,572

(22) Filed: Oct. 18, 2000

(51) Int. Cl.$^7$ ................................................. G02B 5/32
(52) U.S. Cl. ............................................ 359/15; 359/1
(58) Field of Search ...................................... 359/1, 15

(56) References Cited

U.S. PATENT DOCUMENTS

| | | | |
|---|---|---|---|
| RE27,356 E | | 5/1972 | La Russa ................... 350/157 |
| 3,940,203 A | * | 2/1976 | La Russa ..................... 359/15 |
| 4,093,437 A | | 6/1978 | La Russa ................... 350/174 |
| 4,671,603 A | * | 6/1987 | McQuoid ..................... 359/15 |
| 5,479,273 A | * | 12/1995 | Ramsbottom ................. 359/9 |
| 5,973,805 A | * | 10/1999 | Yamana ....................... 359/15 |

\* cited by examiner

*Primary Examiner*—Cassandra Spyrou
*Assistant Examiner*—Leo Boutsikaris
(74) *Attorney, Agent, or Firm*—Brown & Michaels, PC

(57) ABSTRACT

An apparatus for forming at or closer than infinity one or more images of multiple sources is disclosed. The new concept of this invention will permit the manufacture of a flat holographic beamsplitter and a flat holographic analog of a spherical mirror-beamsplitter. The combination of these elements will produce a very compact full color in-line infinity display system of a thickness ranging from ⅜ of an inch thickness to ⅝ inch (based on size) which requires only an image input screen to provide a collimated display. This ultra-thin collimating display can be used to simulate the real aircraft, marine or automobile windows etc., when cut to replace the real windows thereby providing the observer with a true infinity display through actual window size and thickness. Furthermore these windows can be joined-horizontally and vertically, as the application requires. As store windows for advertising purposes they can provide images either at a selectable distance beyond the window away from an observer or, by reversal of the optical system, the images can be projected in space beyond the window towards the observer to appear floating in space.

7 Claims, 3 Drawing Sheets

IMAGE-FORMING APPARATUS

BACKGROUND OF THE INVENTION

1. Field of the Invention

The invention pertains to the field of image-forming apparatuses. More particularly, the invention pertains to improved apparatuses for forming, at or closer than infinity, a dispersion-free full color image of an object using a holographic analog of a curved mirror.

2. Description of Related Art

In-line infinity display systems capable of forming images at or closer than infinity of an object or a plurality of optically superimposed objects find important application in aircraft flight trainers or spacecraft simulators to provide the user of the trainer or simulator with a realistic "window" for viewing a simulated environment. One such system is described in my U.S. Pat. No. Re. 27,356, hereby incorporated herein by reference, reissued May 9, 1972, known and sold under the Trademark Pancake Window™. In that system a single curved, spherical beamsplitting mirror is used as the image-forming element. A primary image is directed at the convex side of the mirror, and a birefringent beamsplitter and polarizer array positioned on the concave side of the mirror reflects the image back to the spherical mirror, which then collimates the image for viewing by an observer. Selective polarization of light prevents the primary image from being seen directly by the observer. The arrangement of that system obviates the use of an oblique space consuming beam-splitting mirror across the axis of the spherical mirror so that the optical elements can be assembled into a compact package, thereby substantially increasing the field of view. Since, with the exception of the curved mirror, all the elements of the apparatus are in the form of flat sheets, the assembled package or "window" has a relatively thin cross-section. However, the curved mirror by its nature cannot be reduced to flat sheet form and therefore contributes somewhat to the bulk of the apparatus.

Another limitation of the system described in that patent is the fact that the light rays of the primary image must first pass through the optically significant thickness of the curved glass substrate of the spherical beam-splitting mirror before undergoing collimation. The curved glass substrate acts as a meniscus lens, imparting power to the image and introducing spherical and other optical aberrations to the system.

SUMMARY OF THE INVENTION

The present invention provides an improved image-forming system of the holographic type, having a large exit pupil, wide angular field-of-view, being compact, light in weight and of inexpensive construction. Additionally, the arrangement of the present invention eliminates the increase in apparatus size caused by the inherent sagitta of the curved mirror and also eliminates the optical aberrations caused by the meniscus lens effect of the curved mirror substrate thickness. Both these defects are overcome by replacing the curved mirror of the prior image-forming apparatus with a reflection-type holographic analog of a curved mirror.

The present invention, actually manufactured and evaluated, permits the multiplexing of a number of in-line infinity display systems surrounding an observer or observers without generating objectionable lunes, (item 50 FIG. 6). Another major advantage of this new full color holographic in-line infinity display system is that the closeness of the now flat holographic spherical mirror analog beamsplitter 12 to the image reflecting flat beamsplitter 14 and all other elements results in extremely wide fields-of-view, whereas the use of a tilted or oblique beamsplitter severely limits the field-of-view. In the course of experimenting with a holographic mirror analog in an in-line holographic infinity display system (FIG. 4), I discovered, unexpectedly, that the dispersed illumination, after being reflected from the plane beam-splitter back to the analog, was effectively filtered by the holographic analog. The analog reflected and collimated the narrow bandwidths of illumination preferential to the hologram bandwidths and the remaining illumination passed partially through the analog towards the source of illumination and partially back through the flat beamsplitter. This portion of the collimated illumination having been polarized in a manner such that it was blocked by the second polarizer. As a result, the observer viewed a collimated dispersion-free version of the primary image. The holographic mirror acted as a reflection filter, selecting and collimating the narrow bands of illumination from the broad band source illumination reflected by the flat beamsplitter 14, and since the holographic analog was in the form of a thin, flat transparent sheet, the thickness and bulk of the apparatus package was reduced, and no optical power or aberrations were introduced because of the meniscus lens-like effects of a curved glass mirror.

In summary, the present invention is an image-forming apparatus comprising a reflection-type holographic analog of a curved mirror 12. A first polarizer 11 is disposed on the side of the analog corresponding to the convex side of the mirror. A first quarter-wave plate 13 is disposed on the side of the analog corresponding to the concave side of the mirror, and a plane beam-splitting mirror 14 is disposed on the side of the first quarter-wave plate remote from the analog. A second quarter-wave plate 15 is disposed on the side of the beamsplitting mirror remote from the first quarter-wave plate, and a polarizer 16 is disposed on the side of the second quarter-wave plate remote from the beamsplitting mirror. The first and second quarter-wave plates have their fast axes oriented with respect to each other at a first integral multiple of 90°, and the polarizer has its direction of polarization oriented at a second integral multiple of 45° with respect to the fast axis of the second quarter-wave plate. In a preferred embodiment of the invention another polarizer is disposed on the side of the analog corresponding to the convex side of the mirror, the direction of polarization of said other polarizer being oriented 45° with respect to the fast and slow axes of the first quarter-wave plate.

Standard in-line infinity display systems, due to multiple internal reflections, do generate a "ghost" image of from 2% to 4% of the brightness of the wanted image. Ghosts although very low in brightness and almost invisible in daylight or bright scenes are undesirable in dusk or night scenes. In this invention such ghosts can be almost entirely eliminated by coating the first endplate 43 closest to the screen 41 not only with an anti-reflection coating on the screen side but also with a "stepped" reflection coating of bandwidths that lie between the bandwidths of the analog spherical mirror. In this manner all bandwidths of RGB that are not used in the display system are rejected by the endplate 43 closest to screen 41 so that only the desired bandwidths are operated on by the invention. It is also evident that the same result could be obtained by merely filtering out all RGB bandwidths not desired at the projector.

The present invention provides an improved image-forming system of the holographic type, having a large exit pupil, wide angular field of view, being compact, light in weight and of inexpensive construction. Additionally, the arrangement of the present invention eliminates the increase in apparatus size caused by the inherent sagitta of the curved mirror and also eliminates the optical aberrations caused by the meniscus lens effect of the curved mirror substrate thickness. Both of these defects are overcome by replacing the curved mirror of the prior image-forming apparatus with a reflection-type holographic analog of a curved mirror.

This invention, actually manufactured and evaluated, permits the multiplexing of a number of in-line infinity display systems surrounding an observer or observers without generating objectionable lunes (see FIG. 6). Another major advantage of this new full color holographic in-line infinity display system is that the closeness of the now flat beamsplitter mirror to the image reflecting flat beamsplitter and all other elements results in extremely wide fields of view, whereas the use of a tilted or oblique beamsplitter severely limits the field of view. In the course of experimenting with a holographic mirror analog in an in-line holographic infinity display system, I discovered, unexpectedly, that the dispersed illumination, after being reflected from the plane beam-splitter back to the analog, was effectively filtered by the holographic analog. The analog reflected and collimated the narrow bandwidths of illumination preferential to the hologram bandwidths and the remaining illumination passed partially through the analog towards the source of illumination and partially back through the flat beamsplitter. This portion of the collimated illumination having been polarized in a manner such that it was blocked by the second polarizer. As a result, the observer viewed a collimated dispersion-free version of the primary image. The holographic mirror acted as a reflection filter, selecting and collimating the narrow bands of illumination from the broad band source illumination. And since the holographic analog was in the form of a thin, flat transparent sheet, the thickness and bulk of the apparatus package was reduced, and no optical power or aberrations were introduced because of the meniscus lens-like effects of a curved glass mirror.

In summary, the present invention is an image-forming apparatus comprising a reflection-type holographic analog of a curved mirror. A first polarizer is disposed on the side of the analog corresponding to the convex side of the mirror. A first quarter-wave plate is disposed on the side of the analog corresponding to the concave side of the mirror, and a plane beam-splitting mirror is disposed on the side of the first quarter-wave plate remote from the analog. A second quarter-wave plate is disposed on the side of the beamsplitting mirror remote from the first quarter-wave plate, and a polarizer is disposed on the side of the second quarter-wave plate remote from the beam-splitting mirror. The first and second quarter-wave plates have their fast axes oriented with respect to each other at a first integral multiple of 90°, and the polarizer has its direction of polarization oriented at a second integral multiple of 45° with respect to the fast axis of the second quarter-wave plate. In a preferred embodiment of the invention another polarizer is disposed on the side of the analog corresponding to the convex side of the mirror, the direction of polarization of said other polarizer being oriented 45° with respect to the fast and slow axes of the first quarter-wave plate.

DETAILED DESCRIPTION OF THE INVENTION

Figure 2:
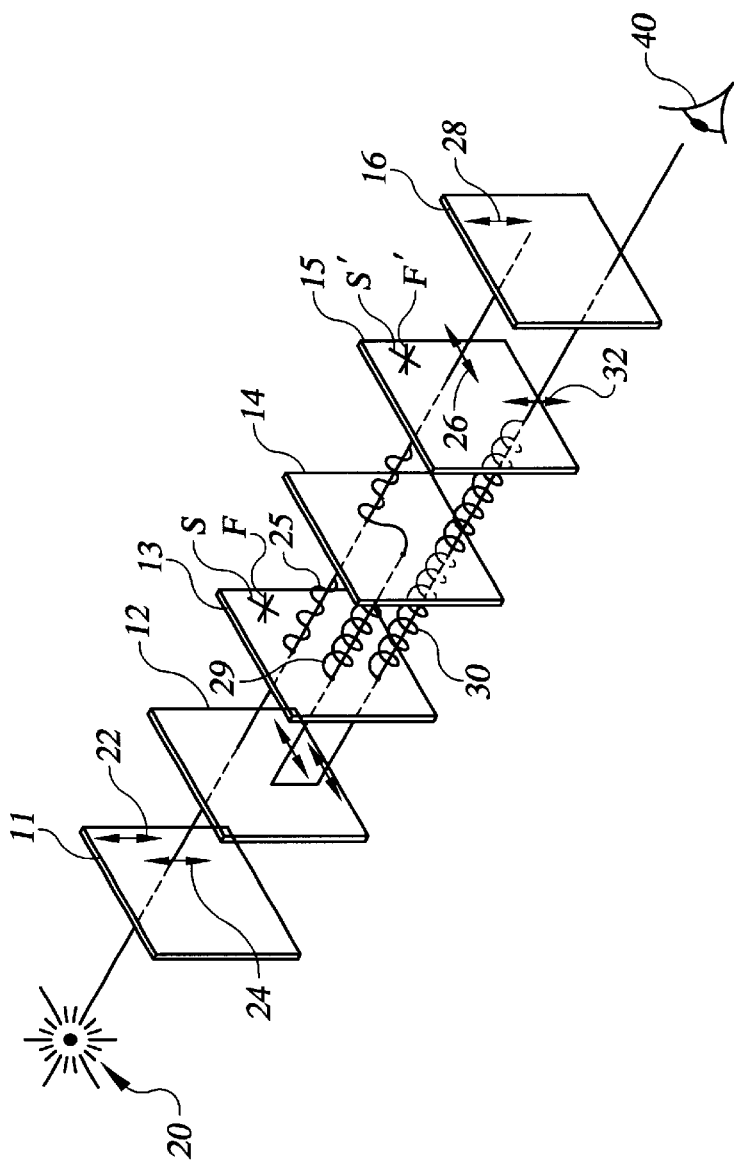
FIG. 2 shows an exploded schematic representation of the apparatus shown in FIG. 1, useful in explaining the operation of the invention.
Figure 1:
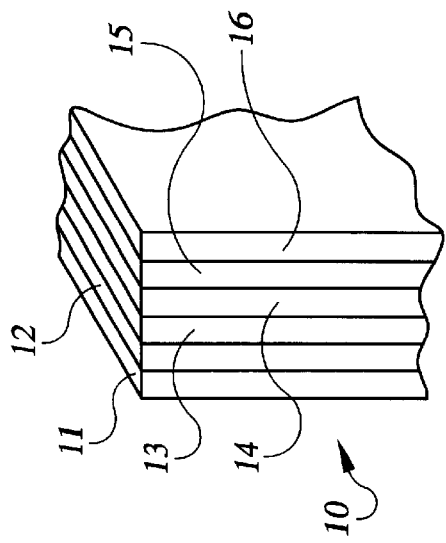
FIG. 1 shows a fragmentary view of a preferred embodiment of the image-forming apparatus in accordance with the present invention.
Figure 3:
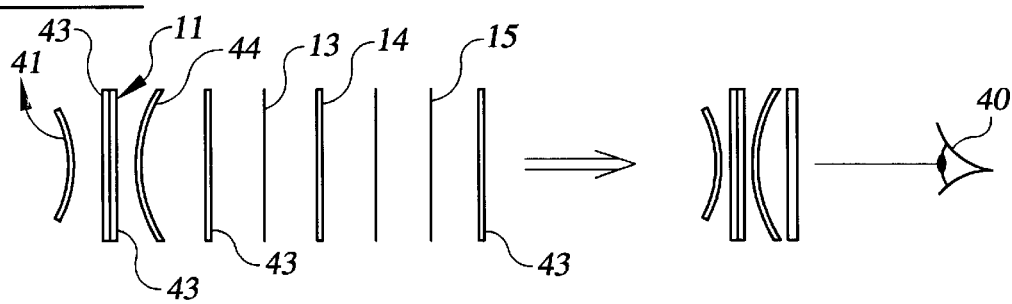
FIG. 3 shows a standard in-line infinity display system array of elements and the longitudinal dimension of all the elements.
Figure 4:
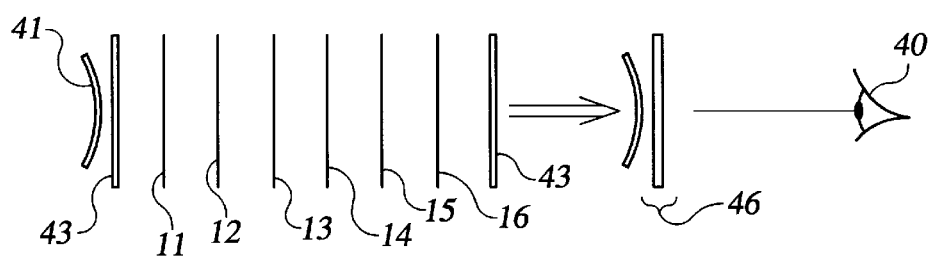
FIG. 4 shows the holographic in-line infinity display system of the present invention, with a longitudinal dimension of anywhere from ⅜ inch to ⅝ inch, depending on window size. This assembly provides much less thickness, lighter weight and a wider field-of-view.

FIG. 1 shows a portion of a preferred embodiment of image-forming apparatus according to the present invention arranged in a package 10 of six optical elements 11–16 each in flat sheet form and stacked together. FIG. 2 shows a view of the elements 11–16 of the package 10 exploded for ease of explanation. Reference numeral 20 identifies a primary image source of unpolarized light. Although the image source 20 is shown as a point in FIG. 2 it is usually an extended source materialized at a diffusing screen.

A first polarizer 11 imposes linear polarization on the light from the source 20 which passes through it. The direction of the polarization of polarizer 11 is identified by a vertical arrow 22, although any other direction can be employed. The resultant polarization of the light passing through the polarizer 11 is indicated by the vertical arrow 24. From the polarizer 11 the linearly polarized light passes through a reflection-type holographic analog 12 of a curved mirror. Typically, the analog will be of a concave spherical mirror. Such analogs are well known to those skilled in the art and are made by superimposing a coherent monochromatic "reference" beam of light and a coherent "object" beam of light upon a transparent photosensitive layer to form an interference pattern within the photosensitive layer. The layer is then photographically developed to produce the holographic analog. One particularly effective method for producing holographic analogs of curved mirrors is described in my U.S. Patent Application Ser. No. 445,747., filed Feb. 25, 1974, now abandoned, incorporated herein by reference, and in my U.S. Pat. No. 2517 094.

The holographic analog 12 is positioned so that the side of the analog 12 corresponding to the convex side of the curved mirror is facing the polarizer 11. A first quarter-wave plate 13 is disposed on the other side of the analog 12, i.e. on the side corresponding to the concave reflecting side of the mirror. The plate 13 has mutually perpendicular fast and slow axes F and S oriented at 45° to the direction of polarization 22 of the polarizer 11. The linearly polarized light emerging from the quarter-wave plate 13 is circularly polarized, either right or left, depending upon whether the angle between the direction of polarization and the axis F is 45° or –45°, Assuming that the light coming from the plate 13 is right circularly polarized as represented by the helix 25, this light next encounters a plane, partially transmitting and partially reflecting beam-splitting mirror 14, and the fraction of this light passing through the mirror 14 goes on to a second quarter-wave plate 15. The fast and slow axes F' and S' of plate 15 are parallel, respectively to the corresponding axes of plate 13. The second quarter-wave plate 15 acts to change the right circularly polarized light from the mirror 14 back to linearly polarized light having a direction of polarization oriented at 90° to the direction of polarization 22 of the polarizer 11. This is indicated in FIG. 2 by means of the arrow 26. The linearly polarized light emitted from the second quarter-wave plate 15 is blocked at a second polarizer 16 whose direction of polarization is parallel to that of the first polarizer 11 as indicated by the arrow 28.

The fraction of the circularly polarized light from the first quarter-wave plate 13 which is reflected at the plane beam-splitting mirror 14 is converted by such reflection into circularly polarized light of the opposite rotation, i.e. into left circularly polarized light in the case assumed. This is indicated in FIG. 2 by the lefthand helix 29. In its reflected passage back toward the source 20 this left circularly polarized light again encounters the first quarter-wave plate 13 which transforms it into linearly polarized light with a direction of polarization at 90° with respect to that of the light first polarized at polarizer 11. This linearly polarized light is then partially reflected by the holographic analog 12 of the spherical mirror without change in the orientation of its polarization direction. The light so reflected becomes left circularly polarized in passage through the first quarter-wave plate 13 as indicated by the left-hand Helix 30. The fraction of this light which is then transmitted through the beam-splitting mirror 14 is converted by the second quarter-wave plate 15 into linearly polarized light having a polarization direction parallel to the polarization direction of the first polarizer 11 as indicated by the arrow 32. This light accordingly is permitted to pass through the second polarizer 16 and constitutes the only fraction of the unpolarized light from the source 20 which is visible to an observer 40 located on the side of the second polarizer 16 remote from the source 20.

The optical combination of the polarizers 11 and 16, quarter-wave plates 13 and 15, and plane beam-splitting mirror 14 forms a virtual image of the primary image source 20 at or near the principal focus of the holographic analog 12. This virtual image is then imaged in turn at or closer than infinity by that analog. All the elements 11–16 of the apparatus can be assembled in a compact flat package, and neither the object ultimately to be imaged nor any oblique beam-splitting mirror need be disposed in the space between the apparatus and observer.

FIG. 2 shows the apparatus used to form an image of a generalized primary image source 20, but the apparatus can be used to form images of real objects, diffusely radiating images or real aerial images as described in my above-noted U.S. Pat. No. Re. 27,356.

Moreover, although in FIG. 2 the polarizers 11 and 16 have their directions of polarization parallel to each other, and the quarter-wave plates 13 and 15 also have their fast and slow axes respectively parallel to each other, the present invention is not limited to this particular arrangement. If, instead, the polarizers 11 and 16 have their polarization directions perpendicular to each other, and the quarter-wave plates also have their respective corresponding axes crossed, the operation of the apparatus will be essentially the same.

In general, therefore, the two quarter-wave plates 13 and 15 should both have their mutually perpendicular fast and slow axes oriented at substantially +45° to the direction of polarization of each of the polarizers 11 and 16. The two quarter-wave plates 13 and 15 should have their corresponding axes oriented to each other at an angle which is a first substantially integral multiple of 90°, both of these multiples being even or both being odd.

The invention is, of course, not limited to the use of holographic analogs of spherical mirrors, and analogs of other forms of curved mirrors can also be employed. And, although the specific embodiment described herein makes use of a first polarizer 11 to linearly polarize the primary image source, it will be understood that such a polarizer will be unnecessary in the present invention if the primary image source is already linearly or circularly polarized.

Finally, the image-forming apparatus has been shown in an arrangement in which the primary image source 20 is made incident upon the side of the analog 12 corresponding to the convex side of the curved mirror and the observer 40 is situated on the other side of the analog 12 and birefringent array of elements 13–16. However, the apparatus of the present invention is equally effective if the positions of the primary source 20 and observer 40 are interchanged.

Although we did achieve full color spherical mirror analogs using my first patent, it had to be done with three separate films for RGB and then these films had to be superposed in alignment requiring a great deal of skilled labor. Using any one of a DuPont™ development of several different films, each of which is a three dye film, permitting three colors in one film by either sequential or simultaneous exposure. We prefer the use of the DuPont-20 coatings (HRF-700×070-20 or HRF-700x071-20) because they are easier to handle, due to the greater thickness of –20 film, and because the dye absorption peaks are closest to the bandwidths desired at 445 nm, 545 nm and 640 nm.

Figure 7:
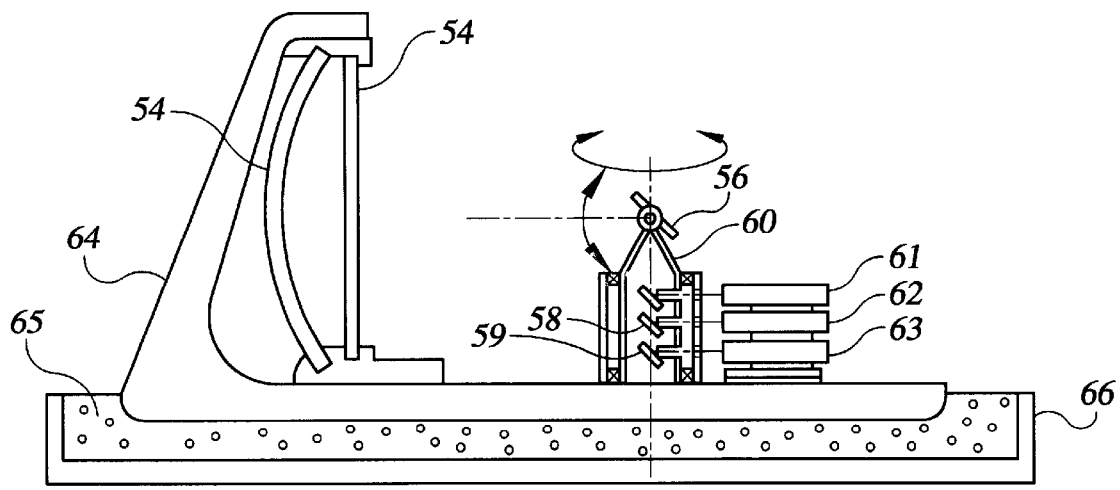
FIG. 7 shows the complete manufacturing assembly being floated in a bed of sand to eliminate shock and/or small vibrations.
Figure 8:
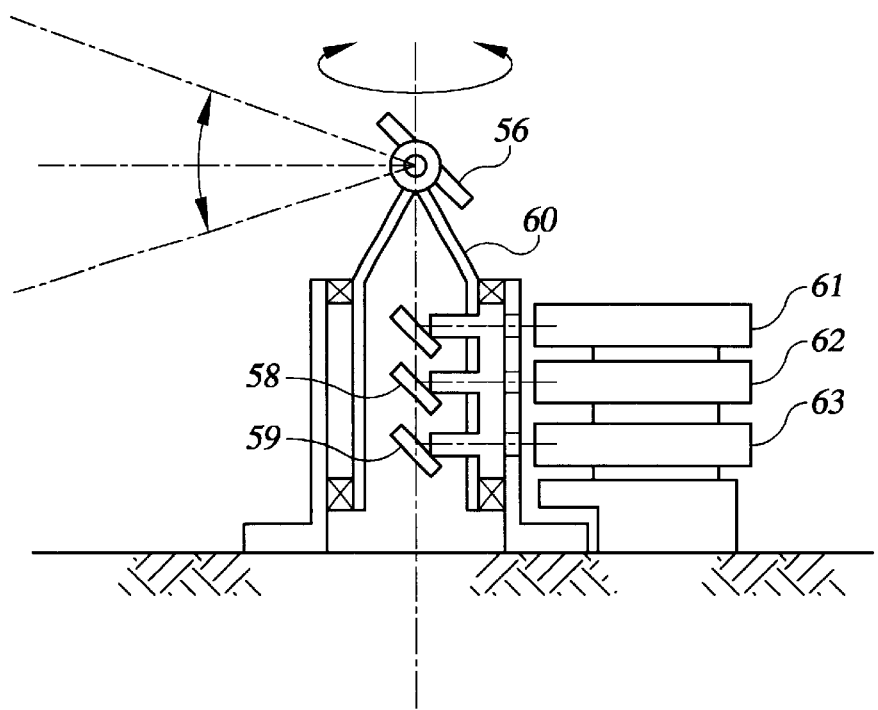
FIG. 8 show a preferred embodiment of the present invention.

As shown in FIG. 7, the method of simultaneous exposure is the preferred method, the three lasers 61, 62, 63 aligned in vertical fashion and reflecting by periscopic reflections off holographically reflecting mirrors 57, 58, 59, which reflect only the RG and B bandwidths individually, said mirrors rotate in unison horizontally to provide a horizontal raster line and off mirror 56 which deflects the horizontal raster lines vertically, thereby generating a complete x-y area exposure of superposed RGB reflectors on a film cemented to the illustrated film plate.

A more detailed method of explaining the exposure process follows. Item 67 illustrates one of two circular ball-bearings which permit the cylinder 60 to drive the vertical scanning mirror 56 in horizontal sweeps. The mirror 56 is also driven through a limited vertical angle so that the laser beams expose the film 12 to RGB laser light from lasers 61, 62 and 63 simultaneously and totally overlapped. The plane mirrors 57 and 58 are narrow bandwidth holographic mirrors each of which reflects only one of the RGB bandwidths in vertical fashion so that each laser beam is coincident with all other laser beams. The three RGB beams are scanned as such onto film 12 as previously explained. The mirrors 57 and 58 reflect only their reflection bandwidths allowing the other bandwidth from laser 63 to pass through adjacent mirrors 57 and 58.

Mirror 56 driven horizontally and vertically about the crossed axes (which is the center of curvature of the master mirror) projects all laser beams to the master mirror which returns the beams as collimated beams to the film plate. The laser beams emanating from the center of curvature of the master mirror project out in a spherical wavefront and reflect back after striking the master mirror in a spherical wavefront which is a mirror image of the first wavefront. When the two wavefronts cross at the film an interference pattern is generated which becomes the holographic spherical mirror analog after being developed. It should be noted that the radius of curvature of the analog will be shorter than that of the master mirror since the film which is exposed to the interference of the two wavefronts is closer to the master mirror center of curvature. This fact is shown in my earlier patent as FIG. 10 of U.S. Pat. No. 5,257,094. The complete (FIG. 7) manufacturing assembly is floated in a bed of sand to eliminate shock and/or small vibrations.

Figure 5:
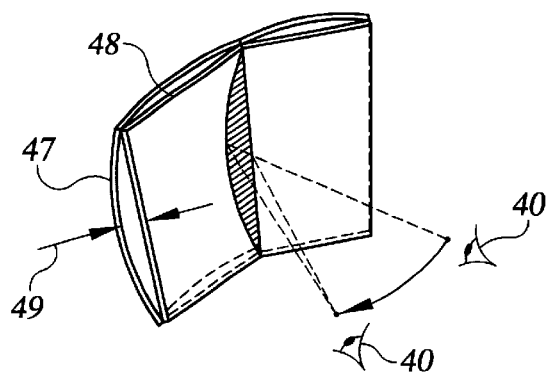
FIG. 5 shows the effect of a separation between birefringent edge and mirror edge.
Figure 6:
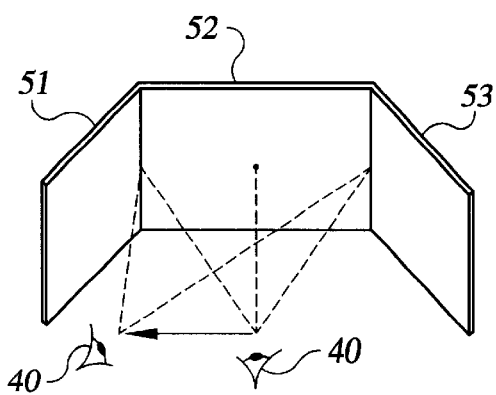
FIG. 6 shows facets of the window put together to increase the field-of-view or to surround an observer. The joints are merely straight lines and these lines are the only visual obstructions. The lines can be as thin as 1/32 to 1/16 of an inch and they provide a continuous field-of-view even with head motion.

Another advantage of this inventive system is that when facets of the window are put together to increase the field-of-view or to surround an observer, the joints are merely straight lines and these lines are the only visual obstructions. The lines can be as thin as 1/32 to 1/16 of an inch and they provide a continuous field-of-view even with head motion as shown in FIG. 6. The standard in-line infinity display system, on the other hand, requires a spherical mirror to butt up against the birefringent which is a flat glass composite sandwich so that the sagitta of the mirror causes a separation between birefringent edge and mirror edge. This separation causes a visual area that causes either crossed view overlaps or dark "lune" areas when an opaque separator is used. This effect is shown in FIG. 5.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. Image-forming apparatus, comprising:
   a) a reflection-type polychromatic, single film holographic analog of a spherical mirror for producing a collimated beam of light;
   b) a first polarizer disposed on a side of said holographic analog corresponding to a convex side of said mirror;
   c) a first quarter-wave plate disposed on a side of said holographic analog corresponding to a concave side of said mirror;
   d) a plane beam-splitting mirror disposed on a side of said first quarter-wave plate remote from said analog;
   e) a second quarter-wave plate disposed on a side of said plane beam-splitting mirror remote from said first quarter-wave plate;
   f) a second polarizer on a side of said second quarter-wave plate remote from said beam-splitting mirror, said first and second quarter-wave plates having fast axes oriented with respect to each other at a first substantially integral multiple of 90°, and said second polarizer having a direction of polarization oriented substantially at an odd integral multiple of 45° to a fast axis of said second quarter-wave plate; and
   wherein all the elements (a) through (f) are enclosed between two end plates of clear glass.

2. The image-forming apparatus of claim 1, further comprising:
   a final polarizer disposed on a side of said analog remote from said first quarter-wave plate, wherein a direction of polarization of said final polarizer and said second polarizer are oriented with respect to each other at a second substantially integral multiple of 90°, wherein said first and second multiples of 90° are even or odd.

3. The image-forming apparatus of claim 1, wherein said holographic analog is an analog of a concave spherical mirror capable of reflecting full color by virtue of a single film or single coating that upon proper exposure reflects full color.

4. The image-forming apparatus of claim 1, wherein said analog, quarter-wave plates, plane beam-splitting minor and polarizers are constituted of flat sheets assembled together in a package by cementing each to the other, and enclosed between two end plates of clear glass having a high efficiency anti-reflection coating on the exterior surface thereof.

5. Apparatus for forming at or closer than infinity a dispersion-free full-color image of a polychromatic primary image, comprising:
   a) a reflection-type polychromatic holographic analog of a spherical mirror for producing a collimated beam of light, arranged to receive light from said primary image on a side of said analog; and
   b) optical means associated with said analog for reflecting a fraction of light transmitted from said primary image through said analog back to an opposite side of said analog of said mirror for reflection thereby for transmitting light so reflected to an observer, and for blocking direct transmission of light transmitted from said primary image through said analog to said observer, such that a dispersion-free full-color image is formed.

6. Apparatus according to claim 5, wherein said holographic analog functions as a reflection filter, selecting and collimating three narrow bands of red, green and blue to result in a full color image from said polychromatic primary image.

7. Apparatus for exposing a film plate, comprising:
   a) a reflection-type polychromatic holographic analog of a spherical mirror for producing a collimated beam of light, arranged to receive light from said primary image on a side of said analog;
   b) optical means associated with said analog for reflecting a fraction of light transmitted from said primary image through said analog back to an opposite side of said analog of said mirror for reflection thereby for transmitting light so reflected to an observer, and for blocking direct transmission of light transmitted from said primary image through said analog to said observer; and
   c) a system wherein a two axis raster scanner exposes small areas on a film plate by three lasers of RGB selected bandwidths, said areas resulting from overlapping beams which scan said film plate in raster fashion by horizontal sweeps and vertical displacements until a fill desired area is so exposed, said overlap areas being so exposed that a final sensitive coating on said plate is uniformly reflective over a total area for all three colors.

* * * * *